UNITED STATES PATENT OFFICE.

EDWIN EUSTON, OF ST. LOUIS, MISSOURI.

PROCESS OF PRODUCING WHITE LEAD.

1,106,794.

Specification of Letters Patent.

Patented Aug. 11, 1914.

No Drawing.  Application filed September 10, 1913.  Serial No. 789,070.

*To all whom it may concern:*

Be it known that I, EDWIN EUSTON, a citizen of the United States, residing at the city of St. Louis, State of Missouri, have invented a certain new and useful Improvement in Processes of Producing White Lead, of which the following is a full, clear, and exact description, such as will enable others skilled in the art to which it appertains to make and use the same.

My invention relates to a process of producing white lead, my object being to provide a new and easily practised method whereby white lead of the best quality may be easily, cheaply and rapidly produced.

I have discovered that by separately preparing and subsequently mixing together the relatively bulky precipitate formed by carbon dioxid gas acting on basic lead acetate solution maintained alkaline, and the relatively dense precipitate obtained by carbon dioxid gas acting on basic lead acetate solution until said solution is eventually approximately neutral chemically, a pigment is obtained which has a opacity, whiteness, spreading and brushing qualities in every way equal to the best known commercial grades of white lead.

One simple and practical way of practising my improved process consists in preparing, in any of the known ways, a solution of basic lead acetate of preferably 20 degrees Baumé (neutral point about 10 degrees Baumé) and spraying said solution through an atmosphere of either dilute or strong carbon dioxid gas in a suitable vessel by a circulating pump until most, but not all, of the basic lead acetate is precipitated, the solution still remaining alkaline. A second and similar solution of basic lead acetate is then prepared and similarly treated with carbon dioxid gas until of approximately neutral reaction, *i. e.*, neither distinctly alkaline nor acid.

The two above described steps may be practised in separate apparatus or alternately in one apparatus and the two products may be directly mixed upon discharge from said apparatus and the so-mixed precipitates removed together from the solution by settling or other known means in preparation for the market; or the two products may be separately settled and the two precipitates so freed from the solutions may then be mixed either before or after drying or before or after mixing with linseed oil in preparation for the market. The strength of solution, the strength of carbon dioxid gas, the pressure of carbon dioxid gas, the temperature and the form of apparatus may be varied and are not essential to the basic idea of my invention which consists, first, in the precipitation of a pigment by carbon dioxid gas from basic lead acetate solution maintained alkaline, second, in the precipitation of a pigment by carbon dioxid gas from a solution of basic lead acetate eventually approximately neutral chemically, and third, in mixing the said two pigments together in proportions to produce a pigment containing approximately from 11.0% to 14.5% carbon dioxid as desired.

I claim as my invention:

1. The process of manufacturing white lead consisting, first, in forming a precipitate by carbon dioxid gas from basic lead acetate solution maintained alkaline, second, in forming a precipitate by carbon dioxid gas from basic lead acetate solution eventually approximately neutral, and third, in mixing the two products thus obtained in proportions to form a pigment containing 11.0% to 14.5% carbon dioxid.

2. The process of producing white lead consisting in the admixture of a precipitate formed by carbon dioxid gas from a basic lead acetate solution maintained alkaline, with a precipitate formed by carbon dioxid gas from a basic lead acetate solution eventually approximately neutral, in proportions to form a pigment containing 11.0% to 14.5% carbon dioxid.

In testimony whereof I hereunto affix my signature in the presence of two witnesses, this 4th day of September, 1913.

EDWIN EUSTON.

Witnesses:
M. P. SMITH,
M. A. HANDEL.